Patented June 1, 1948

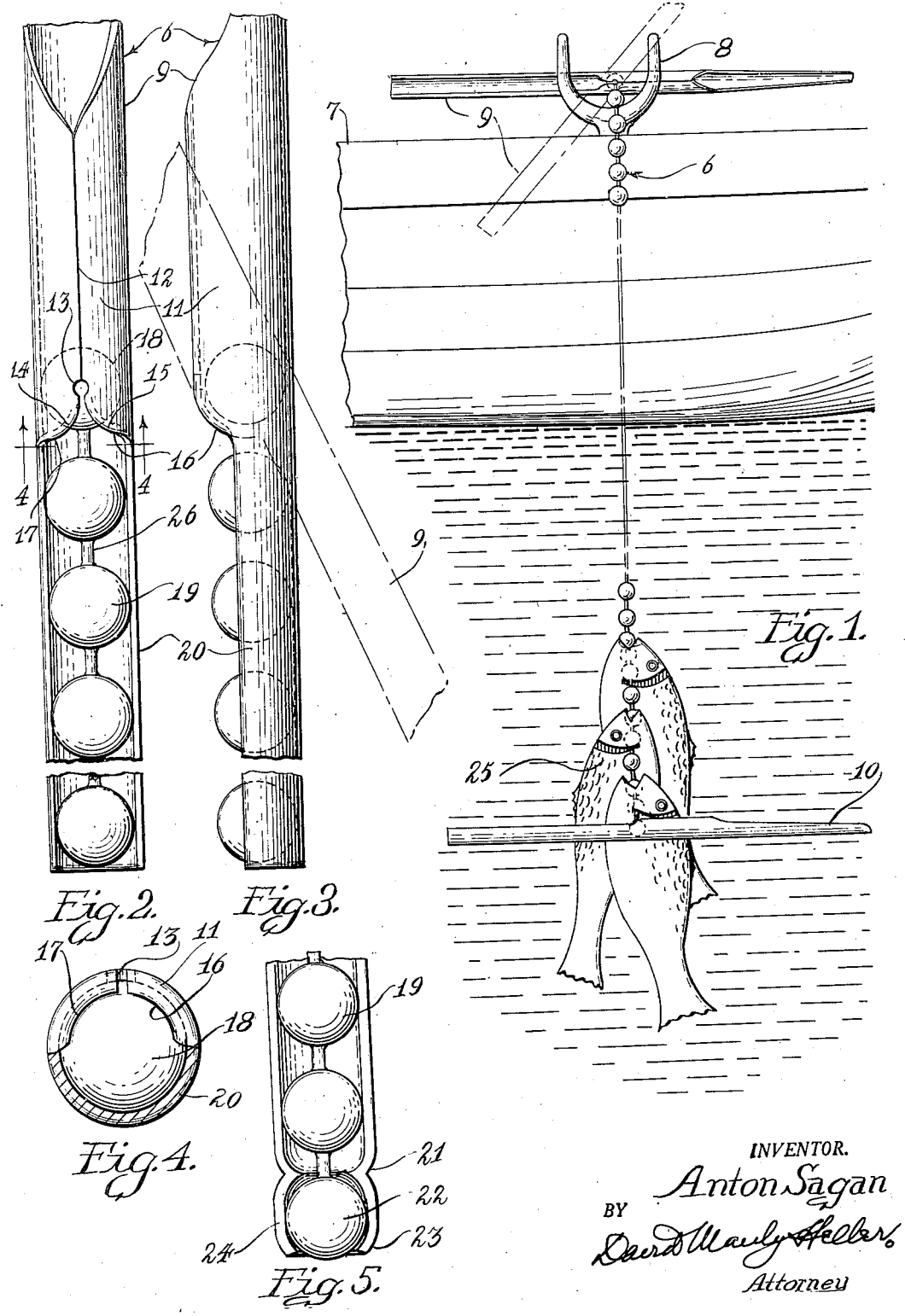

2,442,472

UNITED STATES PATENT OFFICE 2,442,472

FISH STRINGER

Anton Sagan, Chicago, Ill.

Application December 4, 1946, Serial No. 714,011

1 Claim. (Cl. 224—7)

My invention relates to fish stringers, and has for its main object, to provide a fish stringer which has both of its ends secured articulately to needle elements, the said needle elements functioning either for lacing the stringer through the gills of the fish to be strung thereupon, and also functioning as a stop bar for fish strung thereupon.

A further object of my invention is to provide a fish stringer made up of a beaded chain construction, as distinguished from the chain, or cord structure presently employed.

A still further feature of my invention is to provide a needle structure made up of sheet material, having a needle portion formed at one end, and a semi-cylindrical portion formed at the opposite end, adapted to coincidentally act as a pocket portion for the end of the beaded chain means, articulately secured to the said needle means, so as to facilitate stringing the fish onto the said stringer.

A further object of my invention is to provide a needle trough extension which has a reduced portion at the terminus thereof, constructed and arranged to receive one of the beaded elements of the beaded stringer in snapping relationship, thus retaining the same in a snap-on assemblage when the needle is used for stringing fish, and permitting the needle to be motivated at right angles to the fish stringer whenever it is used as a stop for the fish strung on the stringer, or as a rest to be held removably in the bifurcated portion of the oarlock structure conventionally furnished on boats.

Other objects, and ancillary features resident in my invention, will become apparent from an examination of the accompanying drawings, wherein like parts are designated by like symbols, and in which, Fig. 1 is a view showing a fragmentary part of a boat construction, and the method of using my type of fish stringer removably attached to the oarlock thereof, showing also the dual functions of the needle element articulately secured at either end of the fish stringer.

Fig. 2 is an enlarged view of the needle construction comprising an important element of my invention.

Fig. 3 is a side view of Fig. 2.

Fig. 4 is a cross-sectional view taken, substantially, on the lines 4—4 of Fig. 2.

Fig. 5 is a fragmentary, enlarged view showing a slight modification of the rear terminal portion of my needle structure.

Referring to the various views, my invention is generally designated 6. In Fig. 1 it is shown how my stringer may be removably supported in the bifurcated portion 8 of the oarlock usually secured to the side 7 of a boat. The needle structure 9 is shown in detail in Figs. 2, 3 and 4, and comprises a needle made of a piece of sheet metal, or other suitable material folded over at its central portion to form the hollow body with the edges meeting at the seam 12, where the portion 11 of the needle is substantially circular in cross-section.

The terminal portions of the folded body portions 11 are arcuately formed, as indicated at 14 and 15 and are bent downwardly as indicated at 16 and 17 in order to form an abutment to retain the bead 18 of the beaded chain 19 in articulate functioning engagement, yet preventing escapement, or removal thereof from assembly. The small opening 13 receives the wire-like extension 26 in snap relationship, thus holding the needle in removable but firm right-angular arrangement with the beaded chain 19.

The upper portion of the beaded chain 19 is housed in the semi-cylindrical formation, or extension 20 of the needle 9, whenever the needle point 10 is to be used for stringing the fish 25, facilitating the passage of the needle and chain assemblage through the gills of the fish 25. The needle element 9 may then be rotated to 90° position with respect to the beaded chain 19 so that one needle element 9 may be positioned in the oarlock 8, whereas the other needle 9 will be set at right angles, in order to prevent the fish 25 from dropping off the stringer, after being strung thereon.

In Fig. 5 I show a slight modification of the extension 20, wherein the extreme terminal portion thereof 24, has indentations 21 and 23 producing the trough formation therein, and being of such dimension as to receive in snapping engagement removably, the ball 22 of the beaded chain 19. Thus when it is desired to string fish, the beaded chain may be snapped in locking engagement in this form of construction and thus facilitate the stringing of fish. The ball 22 may then be snapped out of engagement, to permit the needle 9 to be rotated to its proper position to either act as a stop bar for the strung fish, or as a support in the oarlock 8.

It is to be noted that with this type of a fish stringer, either end may be utilized for stringing fish, inasmuch as both ends are identical, either end may be used as a stop bar, either end may be used as a support bar, and in removing the fish that have been strung on the stringer, no dismantling of stringer parts are necessary.

One of the needles, or both may be caused to lie in coincidental relationship with the beaded chain, thus permitting removal of fish from both ends simultaneously, and permitting a more efficient and quick removal of fish strung on the stringer, comprising my invention.

I desire it to be understood, that I may make changes in the construction and in the combination, and arrangement of the several parts, provided that such changes fall within the scope of the appended claim.

Having thus described and disclosed my invention, what I claim as novel and desire to secure by Letters Patent, is:

A fish stringer of the character described comprising, beaded chain means, and needle and bar stop means articulately secured substantially at its mid-point to each terminus of the said beaded chain means, the said needle and bar stop means being made of sheet metal to provide a needle portion at one terminus thereof, a trough-like portion at the other terminus thereof constructed and arranged to envelop a portion of the said beaded chain means, and a central portion folded to form a hollow cylindrical portion having a longitudinal seam portion terminating in arcuate lip positions adapted to prevent removal of the said beaded chain means, the said trough-like portion having a constricted terminal portion to secure removably in snapping relationship a bead element of the said beaded chain means.

ANTON SAGAN.

REFERENCES CITED

The following references are of record in the file of this patent:

UNITED STATES PATENTS

| Number | Name | Date |
|---|---|---|
| 927,840 | Dineen | July 13, 1909 |
| 1,176,177 | Sparks | Mar. 21, 1916 |
| 1,608,953 | Pflueger | Nov. 30, 1926 |
| 1,652,112 | Gagnon | Dec. 6, 1927 |
| 2,200,044 | Shannon | May 7, 1940 |